United States Patent
Jiang (10) Patent No.: US 10,747,984 B2
(45) Date of Patent: Aug. 18, 2020

(54) METHOD AND APPARATUS OF FINGERPRINT IDENTIFICATION AND TERMINAL DEVICE

(71) Applicant: SHENZHEN GOODIX TECHNOLOGY CO., LTD., Shenzhen (CN)

(72) Inventor: Fanglin Jiang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 110 days.

(21) Appl. No.: 16/159,675

(22) Filed: Oct. 14, 2018

(65) Prior Publication Data
US 2019/0102598 A1  Apr. 4, 2019

Related U.S. Application Data

(63) Continuation of application No. PCT/CN2017/105119, filed on Sep. 30, 2017.

(51) Int. Cl.
*G06K 9/00* (2006.01)
*G06K 9/22* (2006.01)

(52) U.S. Cl.
CPC ......... *G06K 9/0012* (2013.01); *G06K 9/0004* (2013.01); *G06K 9/0008* (2013.01);
(Continued)

(58) Field of Classification Search
CPC .... G06K 9/0012; G06K 9/00107; G06K 9/22; G06K 9/0008; G06K 9/0004; G06K 9/00087; G06K 9/00912; G06K 2009/0006

See application file for complete search history.

(56) References Cited

U.S. PATENT DOCUMENTS

2010/0148068 A1  6/2010  Schwaneberg et al.
2016/0110025 A1  4/2016  Hossu
(Continued)

FOREIGN PATENT DOCUMENTS

CN    104392227 A    3/2015
CN    106682473 A    5/2017
(Continued)

OTHER PUBLICATIONS

K. A. Nixon et al.:"Spoof Detection Schemes" In: "Handbook of Biometrics", Oct. 1, 2007 (Oct. 1, 2007), Springer, XP055309969, pp. 403-423 , DOI:10.1007/978-0-387-71041-9_20.

*Primary Examiner* — Abhishek Sarma (57) ABSTRACT

The present application discloses a method of fingerprint identification, a fingerprint identification apparatus, a fingerprint identification chip and a terminal device. The method includes: detecting a value of a light signal reflected by a finger when a touch signal of the finger is received on a fingerprint identification area; determining whether the value of the light signal is within a preset numerical range; and determining a fingerprint contacting the fingerprint identification area is a live fingerprint if the value of the light signal is within the numerical range. Therefore, when a finger presses a fingerprint identification area, it is judged that a fingerprint contacting the fingerprint identification area is a live fingerprint or a non-live fingerprint through a value of a light signal reflected by the finger, thereby improving security of a fingerprint password.

9 Claims, 5 Drawing Sheets

(52) U.S. Cl.
CPC ..... *G06K 9/00087* (2013.01); *G06K 9/00107* (2013.01); *G06K 9/22* (2013.01); *G06K 9/00912* (2013.01); *G06K 2009/0006* (2013.01)

(56) References Cited

U.S. PATENT DOCUMENTS

| | | |
|---|---|---|
| 2017/0169275 A1* | 6/2017 | Mackey ............ G06K 9/00013 |
| 2017/0220838 A1 | 8/2017 | He et al. |
| 2017/0300738 A1 | 10/2017 | Druz et al. |
| 2018/0046281 A1 | 2/2018 | Pi et al. |

FOREIGN PATENT DOCUMENTS

| | | |
|---|---|---|
| CN | 106778459 A | 5/2017 |
| CN | 107004130 A | 8/2017 |
| WO | 2016205832 A1 | 12/2016 |

\* cited by examiner

| Detecting a signal value of a reflected light signal generated by an object located above a fingerprint identification area, where the reflected light signal is generated by reflection of light on the object that is emitted by a display screen, and the fingerprint identification area is located in at least part of a display area of the display screen | 310 |

| Judging whether the signal value of the reflected light signal is within a preset numerical range | 320 |

| determining that the object above the fingerprint identification area is a live fingerprint if a value of the reflected light signal is within the numerical range | 330 |

METHOD AND APPARATUS OF FINGERPRINT IDENTIFICATION AND TERMINAL DEVICE

CROSS-REFERENCE TO RELATED APPLICATIONS

This application is a continuation of International Application No. PCT/CN2017/105119, with an international filing date of Sep. 30, 2017, which is hereby incorporated by reference in its entireties.

TECHNICAL FIELD

The present application relates to the field of information technologies, and more particularly, to a method of fingerprint identification, a fingerprint identification apparatus and a terminal device.

BACKGROUND

A fingerprint image can be drawn by using a difference of reflection of light on finger pattern, and fingerprint identification is implemented on an electronic device according to discrimination of fingerprint feature points, such as a mobile phone. However, for a conventional fingerprint identification method, it is required to acquire a fingerprint image for fingerprint identification in a fingerprint identification process, and thus a fingerprint password can be easily cracked as long as a fake finger or a fake fingerprint film is made from a material, such as rubber and plasticine, which causes a huge loss in information security and property safety.

SUMMARY

Embodiments of the present application provide a method and apparatus of fingerprint identification and a terminal device, which are capable of effectively identifying whether a fingerprint contacting a fingerprint identification area is a live fingerprint or a non-live fingerprint, thereby improving security of a fingerprint password.

In a first aspect, a method of fingerprint identification is provided, including: detecting a signal value of a reflected light signal generated by an object located above a fingerprint identification area, where the reflected light signal is generated by reflection of light on the object that is emitted by a display screen, and the fingerprint identification area is located in at least part of a display area of the display screen; judging whether the signal value of the reflected light signal is within a preset numerical range; and determining that the object above the fingerprint identification area is a live fingerprint if a value of the reflected light signal is within the numerical range.

Therefore, when fingerprinting identification is performed, it can be judged that a fingerprint above a fingerprint identification area is a live fingerprint or a non-live fingerprint through a value of a light signal reflected by a finger, thereby improving security of a fingerprint password.

In some possible implementation manners, the method further includes: determining that the object above the fingerprint identification area is a non-live fingerprint if the signal value of the reflected light signal is outside the numerical range.

In some possible implementation manners, the reflected light signal is detected through an optical fingerprint sensor disposed below the display screen, and the optical fingerprint sensor includes a sensing array with a plurality of optical sensing units.

In some possible implementation manners, the light emitted by the display screen presents a preset pattern in the fingerprint identification area, where the detecting the signal value of the reflected light signal generated by the object located above the fingerprint identification area includes: detecting, by at least a part of the optical sensing units below the fingerprint identification area, the signal value of the reflected light signal generated by the reflection of the light on the object that is emitted in the fingerprint identification area by the display screen.

In some possible implementation manners, the preset pattern is an annular pattern, the annular pattern corresponds to a light-emitting area of the fingerprint identification area, and an intermediate area surrounded by the annular pattern is a non-light-emitting area of the fingerprint identification area;

where the detecting the signal value of the reflected light signal generated by the reflection of the light on the object that is emitted in the fingerprint identification area by the display screen includes:

detecting, by optical sensing units located below the non-light-emitting area, the signal value of the reflected light signal generated by the reflection of the light on the object that is emitted in the fingerprint identification area by the display screen and presents the annular pattern, where the reflected light signal passes through the display screen in the non-light-emitting area and is received by the optical sensing units.

In some possible implementation manners, the preset pattern covers an entire fingerprint identification area, where the detecting the signal value of the reflected light signal generated by the reflection of the light on the object that is emitted in the fingerprint identification area by the display screen includes:

detecting, by all optical sensing units located below the fingerprint identification area, the signal value of the reflected light signal generated by the reflection of the light on the object that is emitted in the fingerprint identification area by the display screen and covers the entire fingerprint identification area, where the reflected light signal passes through the display screen in the fingerprint identification area and is received by the optical sensing units.

In some possible implementation manners, the preset pattern is further used to indicate a position of the fingerprint identification area in the display screen, for a user to determine the fingerprint identification area according to the present pattern.

In some possible implementation manners, the method further includes:

capturing, according to the reflected light signal generated by the reflection of the light on the object located above the fingerprint identification area that is emitted by the display screen, a fingerprint image; and matching the fingerprint image with a fingerprint image in a fingerprint database if it is determined that the object above the fingerprint identification area is a live fingerprint.

In a second aspect, a fingerprint identification apparatus is provided, the fingerprint identification apparatus including an optical fingerprint sensor and a processor, where the optical fingerprint sensor is configured to detect a signal value of a reflected light signal generated by an object located above a fingerprint identification area, where the reflected light signal is generated by reflection of light on the object that is emitted by a display screen, and the fingerprint identification area is located in at least part of a display area of the display screen; and the processor is configured to judge whether the signal value of the reflected light signal that is detected by the optical fingerprint sensor is within a preset numerical range, and determine that the object above the fingerprint identification area is a live fingerprint when the signal value of the reflected optical signal is within the numerical range.

Therefore, when fingerprinting identification is performed, it can be judged that a fingerprint above a fingerprint identification area is a live fingerprint or a non-live fingerprint through a value of a light signal reflected by a finger, thereby improving security of a fingerprint password.

In some possible implementation manners, the processor is further configured to: determine that the object above the fingerprint identification area is a non-live fingerprint when the signal value of the reflected light signal is beyond the numerical range.

In some possible implementation manners, the optical fingerprint sensor is disposed below the display screen, and the optical fingerprint sensor includes a sensing array with a plurality of optical sensing units.

In some possible implementation manners, the light emitted by the display screen presents a preset pattern in the fingerprint identification area, where at least a part of the optical sensing units located below the fingerprint identification area in the optical fingerprint sensor is configured to detect the signal value of the reflected light signal generated by the reflection of the light on the object that is emitted in the fingerprint identification area by the display screen.

In some possible implementation manners, the preset pattern is an annular pattern, the annular pattern corresponds to a light-emitting area of the fingerprint identification area, and an intermediate area surrounded by the annular pattern is a non-light-emitting area of the fingerprint identification area;

where optical sensing units located below the non-light-emitting area in the optical fingerprint sensor is configured to detect the signal value of the reflected light signal generated by the reflection of the light on the object that is emitted in the fingerprint identification area by the display screen and presents the annular pattern, where the reflected light signal passes through the display screen in the non-light-emitting area and is received by the optical sensing units.

In some possible implementation manners, the preset pattern covers an entire fingerprint identification area, where all optical sensing units located below the fingerprint identification area in the optical fingerprint sensor are configured to detect the signal value of the reflected light signal generated by the reflection of the light on the object that is emitted in the fingerprint identification area by the display screen and covers the entire fingerprint identification area, where the reflected light signal passes through the display screen in the fingerprint identification area and is received by the optical sensing units.

In some possible implementation manners, the preset pattern is further used to indicate a position of the fingerprint identification area in the display screen, for a user to determine the fingerprint identification area according to the present pattern.

In some possible implementation manners, the optical fingerprint sensor is further configured to capture a fingerprint image according to the reflected light signal generated by the reflection of the light on the object located above the fingerprint identification area that is emitted by the display screen; and the processor is further configured to match the fingerprint image with a fingerprint image in a fingerprint database when it is determined that the object above the fingerprint identification area is a live fingerprint.

In a third aspect, a computer readable medium is provided, for storing a computer program, the computer program including an instruction for executing a method in the first aspect or any possible implementation manner of the first aspect.

In a fourth aspect, a fingerprint identification chip is provided, the fingerprint identification chip including the fingerprint identification apparatus of the foregoing second aspect or any possible implementation manner of the second aspect.

In a fifth aspect, a terminal device is provided, the terminal device including the fingerprint identification apparatus of the foregoing second aspect or any possible implementation manner of the second aspect.

DESCRIPTION OF EMBODIMENTS

The technical solutions in embodiments of the present application will be described hereinafter in conjunction with the attached drawings.

It should be understood that, the embodiments of the present application may be applied to an optical fingerprint system, which includes but not limited to an optical fingerprint identification system and a medical diagnostic product based on optical fingerprint imaging and the like; and the embodiments of the present application only take an optical fingerprint system as an example for description, which should not constitute any limit to the embodiments of the present application, and the embodiments of the present application are also applicable to other systems adopting optical imaging technologies and the like.

For a conventional fingerprint identification method, it is required in a fingerprint identification process to acquire a fingerprint image of a finger and match the fingerprint image with a fingerprint in a fingerprint database, and an unlocking operation is performed if the matching is successful. However, a fingerprint password can be easily cracked as long as a fake fingerprint layer identical to the fingerprint image of the finger is made from a special material. Common materials on the market that can be used to make the fake fingerprint layer include wood glue, white glue, silica gel and the like, in addition, the fake fingerprint layer may also be obtained by means of ink printing or the like.

For the foregoing fake fingerprint layer, according to the embodiments of the present application, when fingerprint identification is performed, it can be determined that a finger contacting a fingerprint identification area is a live fingerprint or a fake fingerprint layer (that is, a non-live fingerprint) based on differences in characteristics of absorption and reflection of light by a real live fingerprint and the fake fingerprint layer, thereby improving security of a fingerprint password.

As a common application scene, a fingerprint identification method, a fingerprint identification apparatus and a fingerprint identification chip provided by the embodiments of the present application can be applied to a smart phone, a tablet computer and another mobile terminal having a display screen or another terminal device; and more particularly, in the foregoing terminal devices, a fingerprint identification system may specifically be an optical fingerprint system, which may be disposed in a local area or an entire area below a display screen, thereby forming an under-display (Under-display) optical fingerprint system.

Figure 1:
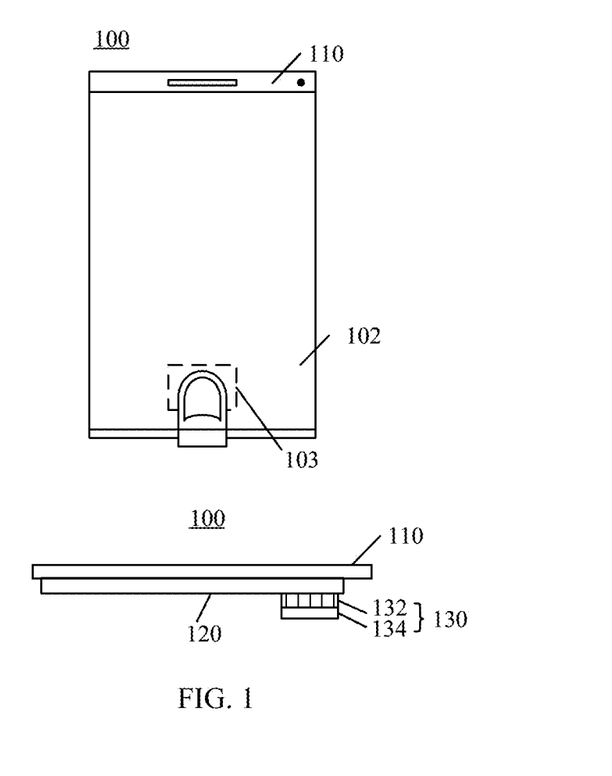
FIG. 1 is a schematic structural diagram of a terminal device applicable to an embodiment of the present disclosure.

FIG. 1 illustrates a schematic structural diagram of a terminal device applicable to an embodiment of the present disclosure. An optical fingerprint system of a terminal device 100 includes a display screen 120 and an optical fingerprint apparatus 130, where the optical fingerprint apparatus 130 is disposed in a local area below the display screen 120. The optical fingerprint apparatus 130 may specifically be an optical sensor, which includes a sensing array with a plurality of optical sensing units, and an area where the sensing array is located is a fingerprint identification area 103 of the optical fingerprint apparatus 130. As shown in FIG. 1, the fingerprint identification area 103 is located in a display area 102 of the display screen 120, and thus when a user needs to unlock or perform fingerprint identification verification on the terminal device, fingerprint input can be implemented as long as a finger is pressed on the fingerprint identification area 103 located in the display screen 120. Since fingerprint detection can be implemented inside the screen, a front surface of the terminal device 100 using the foregoing structure does not need to specifically reserve a space to set a fingerprint button (such as a Home button), so that a full screen solution can be adopted, that is, the display area 102 of the display screen 120 can be substantially extended to the entire front surface of the terminal device 100.

As a preferred embodiment, the display screen 120 may be a self-emitting display screen, which adopts a self-emitting display unit as a display pixel, such as an organic light-emitting diode (Organic Light-Emitting Diode, OLED) display screen or a micro light-emitting diode (Micro-LED) display screen. Taking an OLED display screen as an example, the optical fingerprint apparatus 130 can utilize an OLED display unit (that is, an OLED light source) of the OLED display screen 120 that is located in the fingerprint identification area 103 as an excitation light source for optical fingerprint detection. Moreover, the sensing array of the optical fingerprint apparatus 130 specifically is a photo detector (Photo detector) array including a plurality of photo detectors distributed in an array, and the photo detectors may server as the optical sensing units as described above. When a finger touches, presses, or approaches the fingerprint identification area 103, light emitted by a display unit of the fingerprint identification area 103 is reflected by a finger- print on a finger surface to form reflected light, where reflected light of a ridge of the fingerprint of the finger is different from that of a valley of the fingerprint of the finger, and the reflected light from the display screen 120 is received by the photo detector array, and converted into a corresponding electrical signal, that is, a fingerprint detection signal; and fingerprint image data can be obtained based on the fingerprint detection signal, and fingerprint matching verification can be further performed, thereby implementing an optical fingerprint identification function at the terminal device 100.

In other alternative embodiments, the optical fingerprint apparatus 130 may also be disposed in an entire area under the display screen 120, so as to extend the fingerprint identification area 130 to the entire display area 102 of the display screen 120, thereby implementing full screen fingerprint detection. Alternatively, the optical fingerprint apparatus 130 may also be disposed in a predetermined area inside the terminal device 100, such as an edge area of the terminal device 100, and a light guiding structure is disposed below the display screen 120 to guide the reflected light of the finger surface to the sensing array of the optical fingerprint apparatus 130.

It should be understood that in a specific implementation, the terminal device 100 may further include a transparent protective cover 110, the cover 110 may specifically be a transparent cover, such as a glass cover or a sapphire cover, which is located on the display screen 120 and covers the front surface of the terminal device 100. In the embodiment of the present application, the so-called finger touching, pressing or approaching the display screen 120 may actually refer to the finger touching, pressing or approaching the cover 110 on the display screen 120 or covering a surface of a protective layer of the cover 110. In addition, the terminal device 100 may further include a touch sensor, and the touch sensor may specifically be a touch panel, which may be disposed on a surface of the display screen 120 or may be partially or entirely integrated into an interior of the display screen 120, that is, the display screen 120 specifically is a touch control display screen.

As an optional implementation, as shown in FIG. 1, the optical fingerprint apparatus 130 includes a light detection portion 134 and an optical component 132, where the light detection portion 134 includes the sensing array, a read circuit electrically connected with the sensing array and other auxiliary circuits, and they may be made on one die (Die) by a semiconductor process; and the optical components 132 may be disposed above the sensing array of the light detection portion 134, the optical component 132 may specifically include a filter (Filter), a light guiding layer and other optical elements, the filter can be used to filter ambient light penetrating the finger, and the light guiding layer is mainly used to guide the reflected light reflected from the finger surface to the sensing array for optical detection.

In a specific implementation, the optical component 132 may be packaged with the light detection portion 134 in a same optical fingerprint chip, or may also be installed inside an optical fingerprint module. The light guiding layer may specifically be a collimator (Collimator) layer or a lens (Lens) layer made on a semiconductor silicon wafer, which has a plurality of collimating units or lens units. The collimating units may specifically be small holes. In the reflected light reflected from the finger, light that is incident perpendicularly to the collimating units can pass through and be received by the optical sensing units below the collimating units while light that is obliquely incident is attenuated inside the collimating units through multiple reflection, and thus each optical sensing unit can only basically receive reflected light reflected from finger pattern right above it, so that the sensing array can detect a fingerprint image of the finger.

In the optical fingerprint apparatus 130, each collimating unit or lens unit may respectively correspond to one of the optical sensing units of the sensing array; alternatively, a non-one-to-one correspondence relationship may also be used between the collimator units or the lens units and the optical sensing units of the sensing array to reduce generation of Moire fringe interference, for example, one optical sensing unit may correspond to a plurality of collimating units or lens units, or the collimating units or the lens units may also adopt a manner of an irregular arrangement; and the collimating units or the lens units that adopt the irregular arrangement may correct the reflected light detected by each sensing unit through a post-software algorithm.

Figure 2:
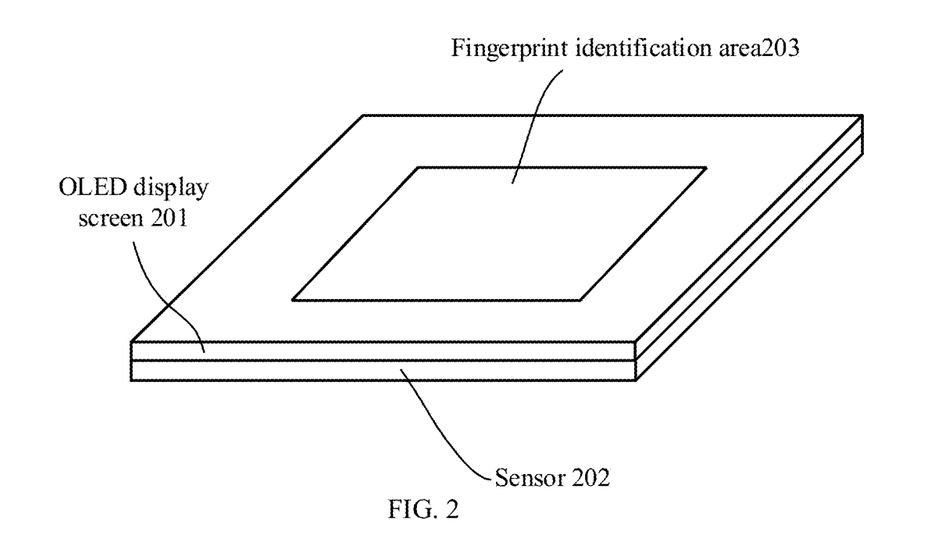
FIG. 2 is a schematic diagram of an application scene of the present application.

FIG. 2 is a reference diagram of a specific application scene of a fingerprint identification method provided by the present application. In the application scene shown in FIG. 2, an optical fingerprint system includes an organic light emitting diode (Organic Light Emitting Diode OLED) display screen 201 and an optical fingerprint sensor (hereinafter also referred to as a sensor) 202 attached to a bottom of the OLED display screen 201. When the optical fingerprint system is applied to the terminal device shown in FIG. 1, the OLED display screen 201 may be equivalent to the display screen 120 of the terminal device shown in FIG. 1, the optical fingerprint sensor 202 may be equivalent to the optical fingerprint apparatus 130 of the terminal device shown in FIG. 1, and a fingerprint identification area 203 may be equivalent to the fingerprint identification area 103 of the terminal device shown in FIG. 1.

The optical fingerprint sensor 202 may include, for example, a sensing array with a plurality of optical sensing units, such as a photo diode (Photo Diode, PD) array, and an area where the sensing array is located is the fingerprint identification area 203. As shown in FIG. 2, the fingerprint identification area 203 is located in part of a display area of the OLED display screen. In a process of fingerprint identification, a finger can touch or press the fingerprint identification area 103 to implement fingerprint input.

When the fingerprint identification is performed, the OLED display screen 201 emits light, when the finger presses the fingerprint identification area 203, the light enters the sensor 202 after passing through the OLED display 201 and being reflected by the finger, the sensor 202 can judge that a fingerprint contacting the fingerprint identification area 203 is a live fingerprint or a non-live fingerprint according to the received reflected light.

Since an optical manner is used in the optical fingerprint system to implement fingerprint sensing signal detection, in other alternative embodiments, when a finger of a user approaches but does not touch or press the fingerprint identification area 203, the light emitted by the OLED display screen 201 may also be reflected on the finger surface, and correspondingly, the reflected light may also return and pass through the OLED display screen 201 to enter the optical fingerprint sensor 202. Namely, the optical fingerprint system can perform optical fingerprint capturing and subsequent fingerprint identification operations as long as the finger is located above the fingerprint identification area 203.

Figure 3:
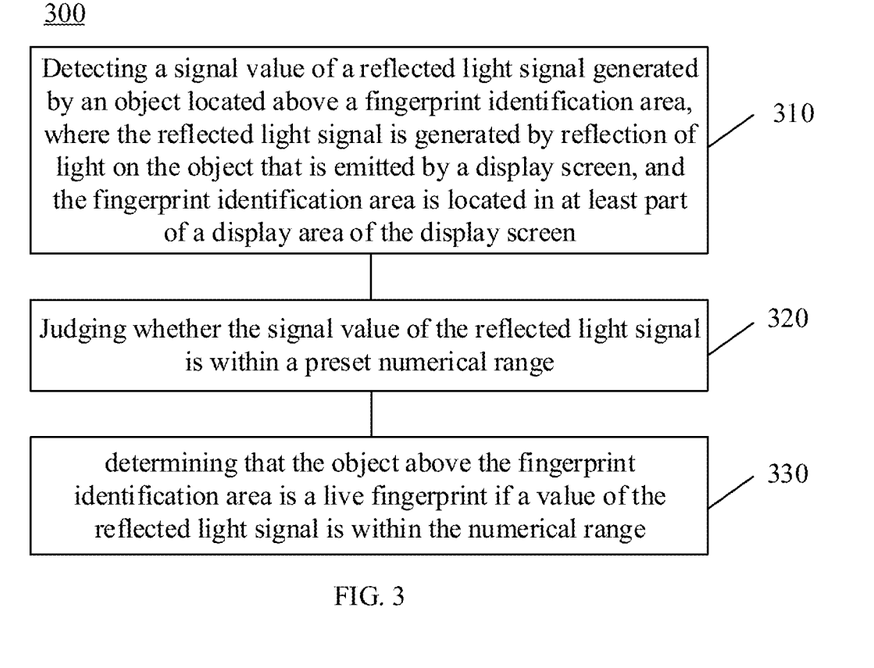
FIG. 3 is a schematic flowchart of a method of fingerprint identification according to an embodiment of the present application.

FIG. 3 illustrates a schematic flowchart of a method 300 of fingerprint identification according to an embodiment of the present application. The method 300 may be performed by a fingerprint identification apparatus, the fingerprint identification apparatus, may include, for example, the optical fingerprint apparatus 130 shown in FIG. 1 or the optical fingerprint sensor 202 shown in FIG. 2, and the fingerprint identification apparatus may be located below a fingerprint identification area of a display screen. Specifically, the fingerprint identification apparatus in the embodiment of the present application may be a fingerprint identification chip. The fingerprint identification chip may be a press-type fingerprint identification chip, a scratch-type fingerprint identification chip or a touch-type fingerprint identification chip, or the like, and the embodiment of the present application is not limited thereto. The fingerprint identification apparatus may be located in a terminal device.

It should be understood that the terminal device in the embodiment of the present application may be an electronic device equipped with a fingerprint identification apparatus, such as a mobile phone, a tablet computer, a notebook or the like, and the electronic device may be, for example, a mobile phone equipped with a fingerprint identification chip.

Specifically, the method 300 may include:

in 310, detecting a signal value of a reflected light signal generated by an object located above a fingerprint identification area, where the reflected light signal is generated by reflection of light on the object that is emitted by a display screen, and the fingerprint identification area is located in at least part of a display area of the display screen;

in 320, judging whether the signal value of the reflected light signal is within a preset numerical range;

in 330, determining that the object above the fingerprint identification area is a live fingerprint if a value of the reflected light signal is within the numerical range.

Optionally, the method further includes: determining that the object above the fingerprint identification area is a non-live fingerprint if the signal value of the reflected light signal is outside the numerical range.

Specifically, the fingerprint identification area for fingerprint detection is located in the at least part of the display area of the display screen. The object on which the fingerprint identification is to be performed is located above the fingerprint identification area. When the light emitted by the display screen is incident to the object above the fingerprint identification area, the reflected light signal generated by the object reaches an optical fingerprint sensor via the display screen, and the optical fingerprint sensor detects the signal value of the reflected light signal generated by the object. If the signal value of the reflected light is within the preset numerical range, it can be considered that the object above the fingerprint identification area is a live fingerprint; and if the signal value of the reflected light is not within the numerical range, it can be considered that the object above the fingerprint identification area is a non-live fingerprint, such as a fake fingerprint layer or a fake fingerprint film.

Therefore, in the embodiment of the present application, when fingerprinting identification is performed, it can be judged that a fingerprint above a fingerprint identification area is a live fingerprint or a non-live fingerprint through a value of a light signal reflected by a finger, thereby improving security of a fingerprint password.

Figure 4:
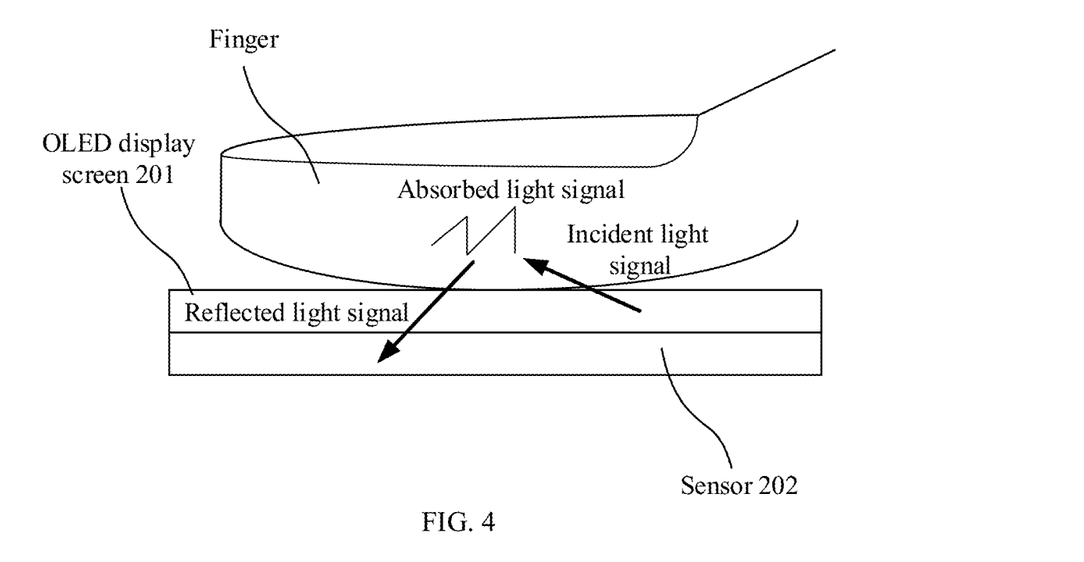
FIG. 4 is a diagram of detection of a live fingerprint of an embodiment of the present application.

As shown in FIG. 4, when a finger is directly placed above a fingerprint identification area, there is a live fingerprint above the fingerprint identification area. A part of light signals emitted by an OLED display screen are absorbed by various tissue layers and blood in the finger, the other part of the light signals are reflected by the finger, and the reflected light passes through the OLED display screen to reach an optical fingerprint sensor.

Figure 5:
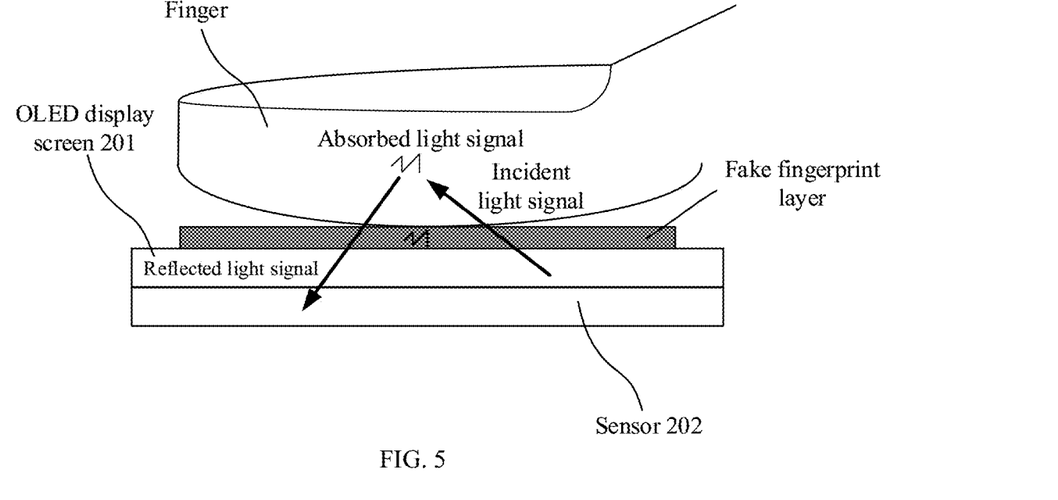
FIG. 5 is a diagram of detection of a non-live fingerprint of an embodiment of the present application.

However, if a fake fingerprint layer is attached to the finger and then placed above the fingerprint identification area, there is a non-live fingerprint above the fingerprint identification area, that is, the fake fingerprint layer. At this time, the light signals reflected by the finger include light signals reflected by the fake fingerprint layer and light signals reflected by the finger. As shown in FIG. 5, when a fake fingerprint layer is located above a fingerprint identification area, since a reflection coefficient of the fake fingerprint layer is relatively high, light signals incident to a finger via the fake fingerprint layer are very weak, the light signals absorbed by the finger are extremely less, and the fake fingerprint layer does not have internal tissues and blood and cannot absorb excessive light signals. Therefore, reflected light signals captured by a sensor are more than the reflected light signals received in FIG. 4.

A numerical range may be obtained through sample training, and the numerical range is a range of a signal value of a reflected light signal when a live fingerprint is located above the fingerprint identification area, that is, a confidence interval of a reflected light signal corresponding to a live fingerprint. The confidence interval of the reflected light signal corresponding to the live fingerprint may be determined by analyzing different samples in a process of multiple fingerprint identification.

In the fingerprint identification process, if a signal value of the reflected light signal detected by an optical fingerprint sensor is within the confidence interval when the finger is placed above the fingerprint identification area, it is considered that there is a live fingerprint above the fingerprint identification area. For example, the numerical interval may be [80 mW, 120 mW]. If a light power of the reflected light signal detected by the optical fingerprint sensor is 100 mW when the finger is placed above the fingerprint identification area, and 100 mW is within the numerical range, then it can be considered that there is a live fingerprint above the fingerprint identification area; and if the light power of the reflected light signal detected by the sensor is 200 mW, and 200 mW is outside the numerical interval, it can be considered that there is a non-live fingerprint above the fingerprint identification area.

The numerical range may be adjusted periodically or non-periodically depending on factors such as time or environment, for example, different numerical ranges may be preset for identification of a live fingerprint and a non-live fingerprint under different background light intensity environments.

Certainly, a confidence interval of a signal value of a reflected light signal corresponding to a non-live fingerprint may also be set. If the light power of the reflected light signal detected by the optical fingerprint sensor is within the numerical range, it is considered that the fingerprint contacting the fingerprint identification area is a non-live fingerprint; and if the light power of the reflected light signal detected by the optical fingerprint sensor is outside the numerical interval, it is considered that there is a live fingerprint above the fingerprint identification area. This is not limited by the present application.

Optionally, the reflected light signal is detected through an optical fingerprint sensor disposed below a display screen, and the optical fingerprint sensor includes a sensing array with a plurality of optical sensing units.

Further, optionally, light emitted by the display screen presents a preset pattern in the fingerprint identification area, where in 310, the detecting the signal value of the reflected light signal generated by the object located above the fingerprint identification area, includes:

detecting, by at least a part of the optical sensing units below the fingerprint identification area, the signal value of the reflected light signal generated by the reflection of the light on the object that is emitted in the fingerprint identification area by the display screen.

The OLED display screen in the embodiment of the present application may display two patterns in the fingerprint identification area, which are respectively described below.

Pattern 1

Optionally, the preset pattern is an annular pattern, the annular pattern corresponds to a light-emitting area of the fingerprint identification area, and an intermediate area surrounded by the annular pattern is a non-light-emitting area of the fingerprint identification area;

where in 330, the detecting the signal value of the reflected light signal generated by the reflection of the light on the object that is emitted in the fingerprint identification area by the display screen includes:

detecting, by optical sensing units located below the non-light-emitting area, the signal value of the reflected light signal generated by the reflection of the light on the object that is emitted in the fingerprint identification area by the display screen and presents the annular pattern, where the reflected light signal passes through the display screen in the non-light-emitting area and is received by the optical sensing units.

Figure 6:
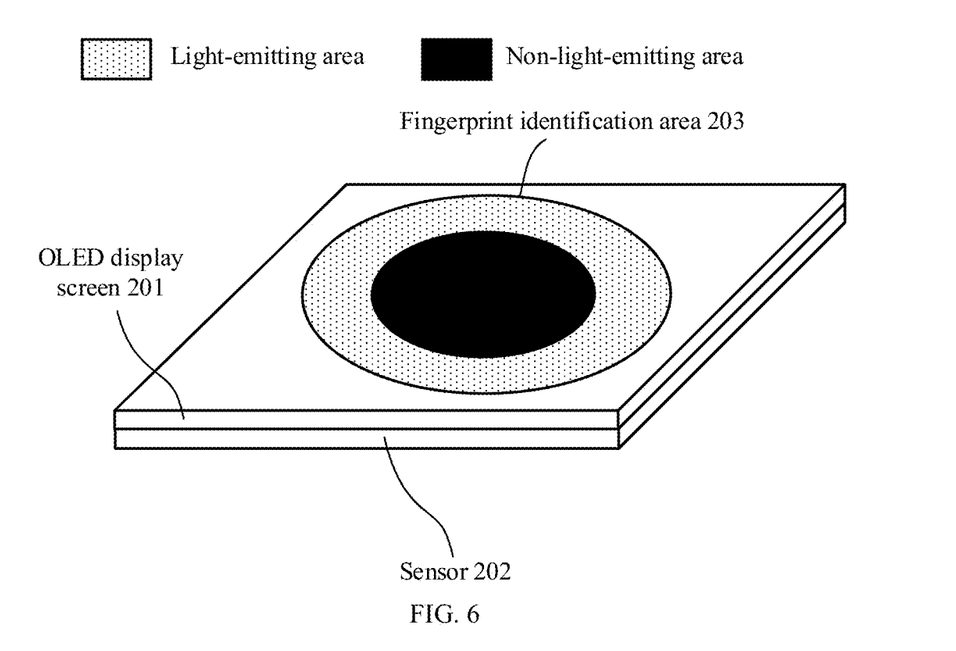
FIG. 6 is a diagram of a fingerprint identification area of an embodiment of the present application.

In this embodiment, the light emitted in the fingerprint identification area by the display screen presents the annular pattern. As shown in FIG. 6, a light-emitting area of a fingerprint identification area is annular, and a circular area surrounded by the annular area is a non-light-emitting area. A light signal reflected by an object above the fingerprint identification area is detected by optical sensing units located below the non-light-emitting area, and the optical sensing units located under the nonlight-emitting area capture the light signal that the object reflects to the non-light-emitting area. In this way, there is a larger difference between a signal value of a reflected light signal detected by an optical fingerprint sensor when a live fingerprint is located above the fingerprint identification area and a value of a reflected light signal detected by the optical fingerprint sensor when a non-live fingerprint is located above the fingerprint identification area, and discrimination therebetween is higher, which makes identification of the live fingerprint and the non-live fingerprint easier.

Pattern 2

Optionally, the present pattern covers an entire fingerprint identification area;

where in 310, the detecting the signal value of the reflected light signal generated by the reflection of the light on the object that is emitted in the fingerprint identification area by the display screen includes:

detecting, by all optical sensing units located below the fingerprint identification area, the signal value of the reflected light signal generated by the reflection of the light on the object that is emitted in the fingerprint identification area by the display screen and covers the entire fingerprint identification area, where the reflected light signal passes through the display screen in the fingerprint identification area and is received by the optical sensing units.

Figure 7:
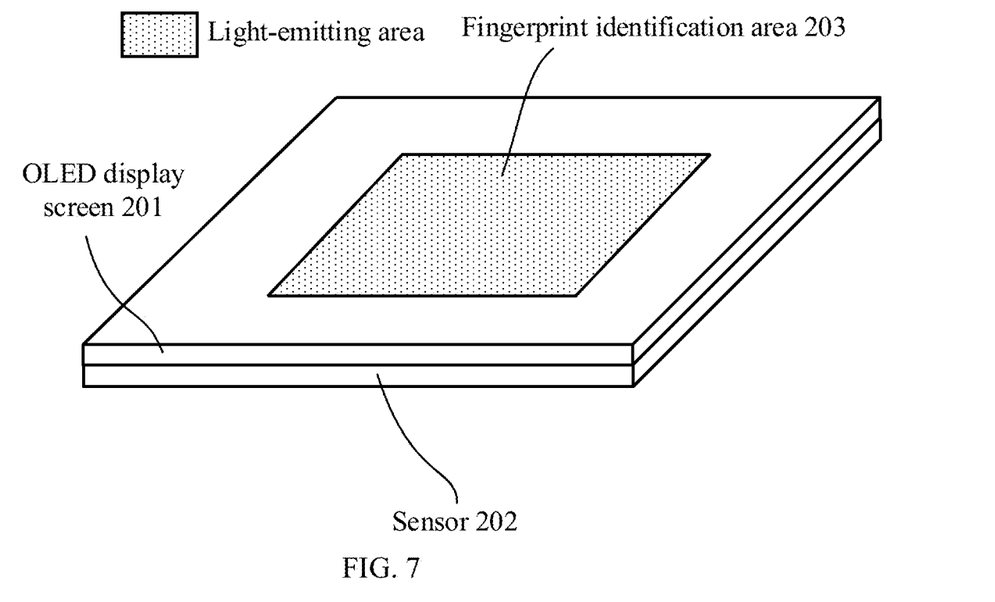
FIG. 7 is a diagram of another fingerprint identification area of an embodiment of the present application.

In this embodiment, the preset pattern formed by the light emitted in the fingerprint identification area by the display screen covers the entire fingerprint identification area. As shown in FIG. 7, the entire fingerprint identification area is a light-emitting area. Light emitted in the fingerprint identification area by a display screen is reflected by an object above the fingerprint identification area, where a reflected light signal generated by the object is detected by all optical sensing units below the fingerprint identification area. In this way, a fingerprint image of the object can be obtained while it is judged whether the object above the fingerprint identification area is a live fingerprint or a non-live fingerprint, to match the fingerprint image with a fingerprint image in a fingerprint database.

The embodiment of the present application does not limit the pattern formed in the fingerprint identification area by the display screen, that is, shapes of the light-emitting area and the non-light-emitting area in the fingerprint identification area are not limited, and a light-emitting color and an illumination pattern may also be set as needed or change at any time. As shown in FIG. 6, the pattern formed by the light emitted in the fingerprint identification area by the display screen is annular. The annular area in the OLED display screen can be controlled to emit light, while the circular area in the middle of the annular area is controlled to emit no light. When fingerprint identification is performed, optical sensing units below the circular non-light-emitting area detect the reflected light signal generated by object above the fingerprint identification area. If a light power value of the reflected light signal is within a preset numerical range of light power, it is considered that the object above the fingerprint identification area is a live fingerprint, otherwise, it is a non-live fingerprint.

Optionally, the preset pattern is further used to indicate a position of the fingerprint identification area in the display screen, for a user to determine the fingerprint identification area according to the present pattern.

For example, if the preset pattern is an annular pattern, when the annular area is illuminated, the user can know a position of the illuminated annular pattern is the fingerprint identification area, so that a finger can be placed on the fingerprint identification area for fingerprinting identification.

Optionally, the method further includes: capturing a fingerprint image according to the reflected light signal generated by the reflection of the light on the object located above the fingerprint identification area that is emitted by the display screen; and matching the fingerprint image with a fingerprint image in a fingerprint database if it is determined that the object above the fingerprint identification area is a live fingerprint.

The specific matching process of the fingerprint images may refer to the existing process of fingerprint identification, which will not be repeated redundantly herein for simplicity.

It should be understood that a sequence of a process of judging that there is a live fingerprint or a non-live fingerprint above a fingerprint identification area, a process of capturing a fingerprint image and a matching process of fingerprint images is not limited in the present application.

For the fingerprint identification area of the pattern 1, the annular pattern is formed by the light emitted in the fingerprint identification area by the display screen. In the process of judging there is a living fingerprint or a non-living fingerprint contacting the fingerprint identification area and the capturing process of the fingerprint image, the light-emitting area of the OLED display is different. In the process of judging there is a live fingerprint or a non-live fingerprint above the fingerprint identification area, the OLED display screen emits light in the annular range of the fingerprint identification area, while the OLED display screen emits light in the entire fingerprint identification area when the fingerprint image is captured.

For example, the light emitted in the fingerprint identification area by the OLED display screen may be first controlled to present a annulus, to identify that the object above the fingerprint identification area is a live fingerprint or a non-live fingerprint; and when the object is identified as a live fingerprint, the OLED display screen is then controlled to emit light in the entire fingerprint identification area, so as to capture the fingerprint image of the live fingerprint. The fingerprint image is matched with a fingerprint image in a fingerprint database, to determine whether the fingerprint can successfully unlock a fingerprint password, and it is confirmed that the unlocking is successful when the matching is successful.

For another example, the OLED display screen can be first controlled to emit light in the entire fingerprint identification area, to capture a fingerprint image of the object located above the fingerprint identification area; after the fingerprint image is captured, the light emitted in the fingerprint identification area by the OLED display screen is controlled to present a annulus, to identify that the object above the fingerprint identification area is a live fingerprint or a non-live fingerprint, and when the object is a live fingerprint, the captured fingerprint image is matched with a fingerprint image in a fingerprint database, and it is confirmed that the unlocking is successful when the matching is successful.

However, for the fingerprint identification area of the pattern 2, as long as the OLED display screen is required to be controlled to emit light in the entire fingerprint identification area, a fingerprint image of a fingerprint is captured while it is judged that the object above the fingerprint identification area is a live fingerprint or a non-live fingerprint.

For example, the OLED display screen is controlled to emit light in the entire fingerprint identification area. The fingerprint image of the fingerprint is captured while it is judged that the object above the fingerprint identification area is a live fingerprint or a non-live fingerprint. When the fingerprint is a live fingerprint, the fingerprint image of the finger is matched with a fingerprint image in a fingerprint database, and it is confirmed that the unlocking is successful when the matching is successful.

For another example, the OLED display screen is controlled to emit light in the entire fingerprint identification area. It is first judged that the object above the fingerprint identification area is a live fingerprint or a non-live fingerprint. When the fingerprint is a live fingerprint, the fingerprint image of the fingerprint is captured, the fingerprint image of the fingerprint is matched with a fingerprint image in a fingerprint database, and it is confirmed that the unlocking is successful when the matching is successful.

For another example, capturing and matching of fingerprint images are performed on the object above the fingerprint identification area in a usual manner. When the matching is successful, it is determined that the fingerprint is a live fingerprint or a non-live fingerprint, and when the fingerprint is a live fingerprint, it is confirmed that the unlocking is successful.

It should be understood that, in various embodiments of the present application, values of sequence numbers of the above-mentioned various processes do not mean an order of execution which should be determined based upon functionalities and internal logics thereof, rather than setting any limitation to implementation of the embodiments of the present application.

A method of fingerprint identification of the embodiments of the present application is described in detail above, and a fingerprint identification apparatus of embodiments of the present application will be described below.

It should be understood that the fingerprint identification apparatus in the embodiments of the present application may perform the method of fingerprint identification in the embodiments of the present application, and has functionalities of performing corresponding methods.

Figure 8:
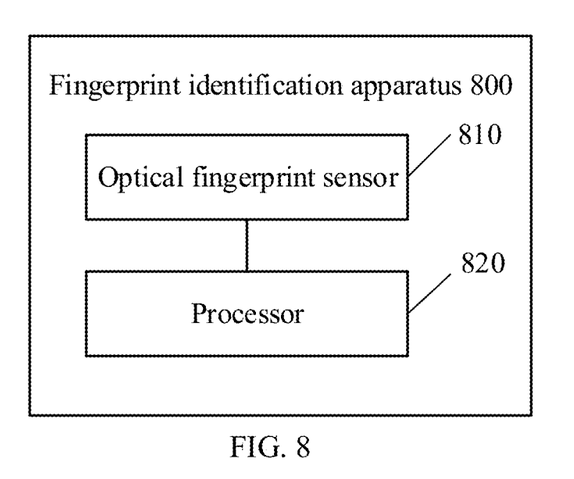
FIG. 8 is a schematic block diagram of a fingerprint identification apparatus of an embodiment of the present application.

FIG. 8 illustrates a schematic block diagram of a fingerprint identification apparatus 800 of an embodiment of the present application. As shown in FIG. 8, the fingerprint identification apparatus includes an optical fingerprint sensor 810 and a processor 820, where the optical fingerprint sensor 810 is configured to detect a signal value of a reflected light signal generated by an object located above a fingerprint identification area, where the reflected light signal is generated by reflection of light on the object that is emitted by a display screen, and the fingerprint identification area is located in at least part of a display area of the display screen; and the processor 820 is configured to judge whether the signal value of the reflected light signal that is detected by the optical fingerprint sensor is within a preset numerical range, and determine that the object above the fingerprint identification area is a live fingerprint when the signal value of the reflected optical signal is within the numerical range.

Therefore, when fingerprinting identification is performed, it can be judged that a fingerprint above a fingerprint identification area is a live fingerprint or a non-live fingerprint through a value of a light signal reflected by a finger, thereby improving security of a fingerprint password.

Optionally, the processor is further configured to: determine that the object above the fingerprint identification area is a non-live fingerprint when the signal value of the reflected light signal is beyond the numerical range.

Optionally, the optical fingerprint sensor is disposed below the display screen, and the optical fingerprint sensor includes a sensing array with a plurality of optical sensing units.

Optionally, the light emitted by the display screen presents a preset pattern in the fingerprint identification area, where at least a part of the optical sensing units located below the fingerprint identification area in the optical fingerprint sensor is configured to detect the signal value of the reflected light signal generated by the reflection of the light on the object that is emitted in the fingerprint identification area by the display screen.

Optionally, the preset pattern is an annular pattern, the annular pattern corresponds to a light-emitting area of the fingerprint identification area, and an intermediate area surrounded by the annular pattern is a non-light-emitting area of the fingerprint identification area;

where optical sensing units located below the non-light-emitting area in the optical fingerprint sensor are configured to detect the signal value of the reflected light signal generated by the reflection of the light on the object that is emitted in the fingerprint identification area by the display screen and presents the annular pattern, where the reflected light signal passes through the display screen in the non-light-emitting area and is received by the optical sensing units.

Optionally, the preset pattern covers an entire fingerprint identification area, where all optical sensing units located below the fingerprint identification area in the optical fingerprint sensor are configured to detect the signal value of the reflected light signal generated by the reflection of the light on the object that is emitted in the fingerprint identification area by the display screen and covers the entire fingerprint identification area, where the reflected light signal passes through the display screen in the fingerprint identification area and is received by the optical sensing units.

Optionally, the preset pattern is further used to indicate a position of the fingerprint identification area in the display screen, for a user to determine the fingerprint identification area according to the present pattern.

Optionally, the optical fingerprint sensor is further configured to capture a fingerprint image according to the reflected light signal generated by the reflection of the light on the object located above the fingerprint identification area that is emitted by the display screen; and the processor is further configured to match the fingerprint image with a fingerprint image in a fingerprint database when it is determined that the object above the fingerprint identification area is a live fingerprint.

The processor may be a central processing unit (Central Processing unit, CPU), and the processor may also be another general-purpose processor, a digital signal processor (DSP), an application-specific integrated circuit (ASIC), a field-programmable gate array (FPGA) or another programmable logic device, a discrete gate or a transistor logic device, a discrete hardware component or the like. The general-purpose processor may be a microprocessor or the processor may be any conventional processor or the like.

In an implementation process, each step of the foregoing method may be completed by an integrated logic circuit of hardware or instructions in a software form in the processor. A step of a method disclosed in an embodiment of the present disclosure may be directly executed by a hardware processor, or executed by a combination of a hardware and a software module in a processor. The software module may be located in a mature storage media in the art, such as a random access memory, a flash memory, a read-only memory, a programmable read-only memory or an electrically erasable programmable memory, a register. The storage medium is located in a memory, and a processor reads information in the memory and completes the steps of the foregoing method in combination with hardware thereof. They are not described in detail herein in order to avoid repetition.

Figure 9:
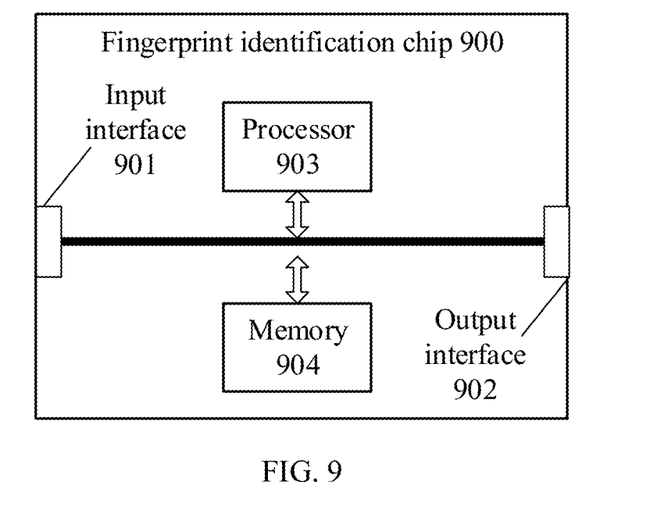
FIG. 9 is a schematic block diagram of a fingerprint identification chip of an embodiment of the present application.

FIG. 9 is a schematic structural diagram of a fingerprint identification chip of an embodiment of the present application. A fingerprint identification chip 900 of FIG. 9 includes an input interface 901, an output interface 902, at least one processor 903 and a memory 904, and the input interface 901, the output interface 902, the processor 903 and the memory 904 are connected with each other through internal connection paths. The processor 903 is configured to execute codes in the memory 904.

Optionally, the processor 903 can implement corresponding operations of the method 300 in the method embodiments when the codes are executed. Detailed description thereof is not set forth herein for simplicity.

An embodiment of the present application further provides a terminal device, and the terminal device may include a display screen and any one of the fingerprint identification apparatuses of the foregoing embodiments of the present application, where the fingerprint identification apparatus is disposed below the display screen. The terminal device 900 is capable of implementing corresponding operations of the method 300 in the method embodiments.

Those of ordinary skill in the art may be aware that, units and algorithm steps of the examples described in the embodiments disclosed in this description may be implemented by electronic hardware, computer software, or a combination of the two. Whether these functions are executed in hardware or software mode depends on the specific applications and design constraint conditions of the technical solutions. Those skilled may implement the described functions by using different methods for each specific application, but this implementation should not be considered to be beyond the scope of the present application.

Those skilled in the art to which the present disclosure pertains may clearly understand that, for convenience and simplicity of description, the specific working processes of the system, the apparatus and the units described above, may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a part displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the respective embodiments of the present disclosure may be integrated in one detection unit, or the respective units singly exist physically, or two or more units are integrated in one unit.

Described above are the specific embodiments of the present application only, but the protection scope of the present application is not limited thereto, those skilled who are familiar with the art could readily think of variations or substitutions within the technical scope disclosed by the present application, and these variations or substitutions shall fall within the protection scope of the present application applicable to the self-interest. Therefore, the protection scope of the present application should be determined with reference to the protection scope of the claims.

What is claimed is:

1. A method of fingerprint identification, the method comprising:
   detecting a signal value of a reflected light signal generated by an object located above a fingerprint identification area, wherein the reflected light signal is generated by reflection of light on the object that is emitted by a display screen, and the fingerprint identification area is located in at least part of a display area of the display screen;
   judging whether the signal value of the reflected light signal is within a preset numerical range; and
   determining that the object above the fingerprint identification area is a live fingerprint if a signal value of the reflected light signal is within the numerical range;
   wherein the reflected light signal is detected through an optical fingerprint sensor disposed below the display screen, and the optical fingerprint sensor comprises a sensing array with a plurality of optical sensing units,
   wherein the light emitted by the display screen presents an annular pattern in the fingerprint identification area, the annular pattern corresponds to a light-emitting area of the fingerprint identification area, and an intermediate area surrounded by the annular pattern is a non-light-emitting area of the fingerprint identification area, and
   wherein the detecting the signal value of the reflected light signal generated by the object located above the fingerprint identification area comprises:
      detecting, by optical sensing units located below the area, the signal value of the reflected light signal generated by the reflection of the light on the object that is emitted in the fingerprint identification area by the display screen and presents the annular pattern, wherein the reflected light signal passes through the display screen in the non-light-emitting area and is received by the optical sensing units.

2. The method according to claim 1, wherein the method further comprises:
   determining that the object above the fingerprint identification area is a non-live fingerprint if the signal value of the reflected light signal is outside the numerical range.

3. The method according to claim 1, wherein the preset pattern is further used to indicate a position of the fingerprint identification area in the display screen, for a user to determine the fingerprint identification area according to the preset pattern.

4. The method according to claim 1, wherein the method further comprises:
   capturing, according to the reflected light signal generated by the reflection of the light on the object located above the fingerprint identification area that is emitted by the display screen, a fingerprint image; and
   matching the fingerprint image with a fingerprint image in a fingerprint database if it is determined that the object above the fingerprint identification area is a live fingerprint.

5. A fingerprint identification apparatus, wherein the fingerprint identification apparatus comprises an optical fingerprint sensor and a processor,
   wherein the optical fingerprint sensor is configured to detect a signal value of a reflected light signal generated by an object located above a fingerprint identification area, the reflected light signal is generated by reflection of light on the object that is emitted by a display screen, and the fingerprint identification area is located in at least part of a display area of the display screen; and
   wherein the processor is configured to judge whether the signal value of the reflected light signal that is detected by the optical fingerprint sensor is within a preset numerical range, and determine that the object above the fingerprint identification area is a live fingerprint when the signal value of the reflected optical signal is within the preset numerical range;
   wherein the optical fingerprint sensor is disposed below the display screen, and the optical fingerprint sensor comprises a sensing array with a plurality of optical sensing units;
   wherein the light emitted by the display screen presents an annular pattern in the fingerprint identification area, the annular pattern corresponds to a light-emitting area of the fingerprint identification area, and an intermediate area surrounded by the annular pattern is a non-light-emitting area of the fingerprint identification area; and wherein optical sensing units located below the non-light-emitting area in the optical fingerprint sensor is configured to detect the signal value of the reflected light signal generated by the reflection of the light on the object that is emitted in the fingerprint identification area by the display screen and presents the annular pattern, wherein the reflected light signal passes through the display screen in the non-light-emitting area and is received by the optical sensing units.

6. The fingerprint identification apparatus according to claim 5, wherein the processor is further configured to:
   determine that the object above the fingerprint identification area is a non-live fingerprint when the signal value of the reflected light signal is beyond the numerical range.

7. The fingerprint identification apparatus according to claim 5, wherein the preset pattern is further used to indicate a position of the fingerprint identification area in the display screen, for a user to determine the fingerprint identification area according to the preset pattern.

8. The fingerprint identification apparatus according to claim 5, wherein
   the optical fingerprint sensor is further configured to capture a fingerprint image according to the reflected light signal generated by the reflection of the light on the object located above the fingerprint identification area that is emitted by the display screen; and
   the processor is further configured to match the fingerprint image with a fingerprint image in a fingerprint database when it is determined that the object above the fingerprint identification area is a live fingerprint.

9. A terminal device, comprising a display screen and a fingerprint identification apparatus, wherein the fingerprint identification apparatus is disposed below the display screen, and comprises an optical fingerprint sensor;
   the optical fingerprint sensor is configured to detect a signal value of a reflected light signal generated by an object located above a fingerprint identification area, wherein the reflected light signal is generated by reflection of light on the object that is emitted by a display screen, and the fingerprint identification area is located in at least part of a display area of the display screen; and
   wherein the object above the fingerprint identification area is determined as a live finger when the signal value of the reflected optical signal is within a preset numerical range;
   wherein the optical fingerprint sensor is disposed below the display screen, and the optical fingerprint sensor comprises a sensing array with a plurality of optical sensing units;
   wherein the light emitted by the display screen presents an annular pattern in the fingerprint identification area, the annular pattern corresponds to a light-emitting area of the fingerprint identification area, and an intermediate area surrounded by the annular pattern is a non-light-emitting area of the fingerprint identification area; and
   wherein optical sensing units located below the non-light-emitting area in the optical fingerprint sensor is configured to detect the signal value of the reflected light signal generated by the reflection of the light on the object that is emitted in the fingerprint identification area by the display screen and presents the annular pattern, wherein the reflected light signal passes through the display screen in the non-light-emitting area and is received by the optical sensing units.

* * * * *